US012562147B2

(12) United States Patent
Xiong et al.

(10) Patent No.: US 12,562,147 B2
(45) Date of Patent: Feb. 24, 2026

(54) SYNCHRONIZATION METHOD AND APPARATUS FOR AUDIO AND TEXT, DEVICE, AND MEDIUM

(71) Applicant: Beijing Bytedance Network Technology Co., Ltd., Beijing (CN)

(72) Inventors: Jiaxin Xiong, Beijing (CN); Hong Feng, Beijing (CN); Hao Zeng, Beijing (CN); Tongxin Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 209 days.

(21) Appl. No.: 18/283,433

(22) PCT Filed: Feb. 15, 2022

(86) PCT No.: PCT/CN2022/076357
§ 371 (c)(1),
(2) Date: Sep. 21, 2023

(87) PCT Pub. No.: WO2022/206198
PCT Pub. Date: Oct. 6, 2022

(65) Prior Publication Data
US 2024/0169972 A1 May 23, 2024

(30) Foreign Application Priority Data
Mar. 31, 2021 (CN) ......................... 202110350637.3

(51) Int. Cl.
*G10L 13/04* (2013.01)
*G10L 21/055* (2013.01)

(52) U.S. Cl.
CPC ............ *G10L 13/04* (2013.01); *G10L 21/055* (2013.01)

(58) Field of Classification Search
CPC ....... G10L 13/04; G10L 21/055; G10L 13/02; G06F 40/10
See application file for complete search history.

(56) References Cited

U.S. PATENT DOCUMENTS 7,174,295 B1 2/2007 Kivimaki
2005/0137867 A1 6/2005 Miller
(Continued)

FOREIGN PATENT DOCUMENTS

CN 1480875 A 3/2004
CN 1617224 A 5/2005
(Continued)

OTHER PUBLICATIONS

Office Action in CN202110350637.3, mailed Oct. 16, 2023, 3 pages.
(Continued)

*Primary Examiner* — Darioush Agahi
(74) *Attorney, Agent, or Firm* — Astute IP Law Group

(57) ABSTRACT

Provided are a synchronization method and apparatus for audio and text, a device, and a medium. The method includes: determining a plurality of first text segments for audio conversion and a second text for reading display, in which the plurality of first text segments and the second text are from an initial text; converting the plurality of first text segments into audio segments, to obtain a first mapping relationship between the first text segments and the audio segments; performing matching on the first text segments and the second text, to obtain a second mapping relationship between the first text segments and second text segments in the second text; determining the second text segment synchronized with each of the audio segments based on the first mapping relationship and the second mapping relationship.

20 Claims, 4 Drawing Sheets

(56) References Cited

U.S. PATENT DOCUMENTS

| | | | | |
|---|---|---|---|---|
| 2008/0005656 | A1 | 1/2008 | Pang et al. | |
| 2011/0320205 | A1* | 12/2011 | Chen | G06F 15/0291 704/E13.011 |
| 2014/0012583 | A1 | 1/2014 | Mok et al. | |
| 2014/0040713 | A1 | 2/2014 | Dzik et al. | |
| 2020/0135205 | A1* | 4/2020 | Tan | G06F 3/167 |
| 2021/0097999 | A1* | 4/2021 | Gao | G06F 3/167 |

FOREIGN PATENT DOCUMENTS

| | | | |
|---|---|---|---|
| CN | 102722527 | A | 10/2012 |
| CN | 104966084 | A | 10/2015 |
| CN | 110110136 | A | 8/2019 |
| CN | 110705264 | A | 1/2020 |
| CN | 110797001 | A | 2/2020 |
| CN | 111312207 | A | 6/2020 |
| CN | 112133309 | A | 12/2020 |
| CN | 112397104 | A | 2/2021 |
| CN | 113096635 | A | 7/2021 |
| JP | 6615952 | B1 | 12/2019 |
| JP | 2021043338 | A | 3/2021 |
| KR | 20130095932 | A | 8/2013 |
| WO | 2018023248 | A1 | 2/2018 |

OTHER PUBLICATIONS

Decision to Grant in CN202110350637.3, mailed Dec. 14, 2023, 1 page.

International Search Report in PCT/CN2022/076357, mailed May 18, 2022, 5 pages.

First Office Action and Search Report in CN202110350637.3, mailed May 26, 2023, 11 pages.

* cited by examiner

SYNCHRONIZATION METHOD AND APPARATUS FOR AUDIO AND TEXT, DEVICE, AND MEDIUM

CROSS-REFERENCE TO RELATED APPLICATION

This is a national stage application filed under 37 U.S.C. 371 of International Patent Application No. PCT/CN2022/076357, filed Feb. 15, 2022, which This application claims priority to Chinese patent Application No. 202110350637.3, filed on Mar. 31, 2021, and titled "SYNCHRONIZATION METHOD AND APPARATUS FOR AUDIO AND TEXT, DEVICE, AND MEDIUM", the disclosures of which are incorporated herein by reference in their entireties.

FIELD

The present disclosure relates to the technical field of communication, and more particularly, to a synchronization method and apparatus for audio and text, a device, and a medium.

BACKGROUND

Text-to-speech (TTS) technology is a method for converting characters of a general text into voice (i.e., audio), for example, a file text stored in a terminal or a text in a webpage displayed by a browser can be converted into an audio output by a natural voice.

At present, TTS of most Applications (APP) is carried out on a client of the application installed on a terminal such as mobile phones and tablet computers, but due to the fact that an operation capability of a client is limited, it is difficult to generate a high-tone-quality audio. For this problem, in order to obtain a relatively high-tone-quality audio, TTS (Text-To-Speech, text-to-speech) processes can be performed at a server. Due to different requirements for display and reading on a chapter text, for the same chapter, a text used by the TTS is different from a text displayed by a reader, so that a matched text cannot be displayed during reading or there is deviation between the displayed text and reading content.

SUMMARY

In order to solve the technical problem or at least partially solve the technical problem mentioned above, embodiments of the present disclosure provide a synchronization method and apparatus for audio and text, a device, and a medium.

In a first aspect, embodiments of the present disclosure are to provide a synchronization method for audio and text. The method includes: determining a plurality of first text segments for audio conversion and a second text for reading display, in which the plurality of first text segments and the second text are from an initial text; converting the plurality of first text segments into audio segments, to obtain a first mapping relationship between the plurality of first text segments and the audio segments; performing matching on the plurality of first text segments and the second text, to obtain a second mapping relationship between the plurality of first text segments and second text segments in the second text; and determining a second text segment synchronized with each of the audio segments based on the first mapping relationship and the second mapping relationship.

In some embodiments, the performing the matching on each of the plurality of first text segments and the second text includes: performing matching on each of the plurality of first text segments and the second text based on one or more symbols in each of the plurality of first text segments and one or more symbols in the second text.

In some embodiments, the performing the matching on each of the plurality of first text segments and the second text based on one or more symbols in each of the plurality of first text segments and one or more symbols in the second text includes: deleting the one or more symbols in the second text to obtain a third text; and for each of the plurality of first text segments: deleting the one or more symbols in the first text segment to obtain a first temporary text segment; searching the third text for a second temporary text segment same as the first temporary text segment; searching the second text for a first symbol previous to the second temporary text segment and a second symbol following the second temporary text segment; and determining, based on the first symbol and the second symbol, the second text segment in the second text that matches with the first text segment.

In some embodiments, the determining, based on the first symbol and the second symbol, the second text segment in the second text that matches with the first text segment includes: determining, based on the first text segment, a third symbol previous to the first temporary text segment and a fourth symbol following the first temporary text segment; performing matching on the first symbol and third second symbol and on the second symbol and the fourth symbol, respectively; and determining, based on a result of the matching, the second text segment in the second text that matches with the first text segment.

In some embodiments, the determining, based on the result of the matching, the second text segment in the second text that matches with the first text segment includes: determining a starting position of the second text segment as the first symbol and an ending position of the second text segment as the second symbol, when the result of the matching indicates that the first symbol is same as the third symbol and the second symbol is same as the fourth symbol; determining the starting position of the second text segment as the first symbol and the ending position as an end of the second text segment, when the result of the matching indicates that the first symbol is same as the third symbol and the second symbol is different from the fourth symbol; determining that the starting position of the second text segment as a beginning of the second text segment and the ending position as the second symbol, when the result of the matching indicates that the first symbol is different from the third symbol and the second symbol is same as the fourth symbol; and determining the starting position of the second text segment as the beginning of the second text segment and the ending position as the end of the second text segment, when the result of the matching indicates that the first symbol is different from the third symbol and the second symbol is different from the fourth symbol.

In some embodiments, the method further includes: merging the first text segment with a next first text segment to obtain a merged text segment, when no second temporary text segment same as the first temporary text segment is found in the third text; determining an ending position of a previous first text segment to the first text segment in the second text to be a starting position of the merged text segment in the second text; and determining an ending position of a next first text segment in the second text to be an ending position of the merged text segment in the second text.

In some embodiments, the determining the plurality of first text segments for audio conversion and the second text for reading display includes: obtaining the initial text, and determining, based on the initial text, the first text for the audio conversion and the second text for the reading display; and splitting the first text into the plurality of first text segments. In some embodiments, the determining, based on the initial text, the first text for audio conversion and the second text for reading display includes: performing first text normalization processing on the initial text to obtain the first text; and performing second text normalization processing on the initial text to obtain the second text.

In some embodiments, the first text normalization processing includes one or more of: deleting target content satisfying a first predetermined condition from the initial text; and performing punctuating on a sentence exceeding a length threshold. The second text normalization processing includes deleting target content satisfying a second predetermined condition from the initial text.

In some embodiments, the splitting the first text into the plurality of first text segments includes: determining one or more symbols in the first text, and splitting the first text based on the one or more symbols, to obtain the plurality of first text segments.

In some embodiments, the method further includes: synthesizing the audio segments into a complete audio, and determining an audio starting time of each of the audio segments in the complete audio; and determining, based on the second text segment synchronized with each of the audio segments, a synchronization relationship between the audio starting time and a text starting position of the second text segment in the second text.

In some embodiments, the method further includes: obtaining an association relationship by associating the complete audio, the second text, and the synchronization relationship.

In a second aspect, embodiments of the present disclosure are to provide a synchronization method for audio and text. The method includes: obtaining a plurality of audio segments and a text segment synchronized with each of the plurality of audio segments; playing one or more of the plurality of audio segments in response to a playing operation; and displaying, during the playing, a text segment synchronized with an audio segment of the plurality of audio segments that is being played.

In a third aspect, embodiments of the present disclosure are to provide a synchronization apparatus for audio and text. The apparatus includes: a first determining unit configured to determine a plurality of first text segments for audio conversion and a second text for reading display, the plurality of first text segments and the second text being from an initial text; a converting unit configured to convert the plurality of first text segments into audio segments, to obtain a first mapping relationship between the plurality of first text segments and the audio segments; a matching unit configured to perform matching on the plurality of first text segments and the second text, to obtain a second mapping relationship between the plurality of first text segments and second text segments in the second text; and a second determining unit configured to determine a second text segment synchronized with each of the audio segments based on the first mapping relationship and the second mapping relationship.

In a fourth aspect, embodiments of the present disclosure are to provide a synchronization apparatus for audio and text. The apparatus includes: an obtaining unit configured to obtain a plurality of audio segments and a text segment synchronized with each of the audio segments; a playing unit configured to play one or more of the audio segments in response to a playing operation; and a display unit configured to display, during the playing, a text segment synchronized with an audio segment of the plurality of audio segments that is being played.

In a fifth aspect, embodiments of the present disclosure are to provide an electronic device. The electronic device includes a processor and a memory. The processor is configured to perform, by calling a program or an instruction stored on the memory, any one of the methods as described above.

In a sixth aspect, embodiments of the present disclosure are to provide a non-transitory computer-readable storage medium. The non-transitory computer-readable storage medium has a program or an instruction stored thereon. The program or the instruction causes a computer to perform any one of the methods as described above.

Compared with the related art, the technical solution according to the embodiments of the present disclosure has following advantages.

In at least one embodiment of the present disclosure, the first text segment for audio conversion and the second text for reading display can be determined from the same initial text. Further, by converting the first text segments into the audio segments and performing the matching on the first text segments and the second text, the second text segment synchronized with the audio segment can be determined. Meanwhile, the second text segment is used for reading display, and the audio segment is used for reading. As a result, audio and text synchronization can be realized, which solves problems in which a matched text cannot be displayed during reading or there is deviation between the displayed text and reading content, which may be caused by different requirements for reading display and reading on the chapter text.

In some embodiments, the audio and text synchronization can be realized. Meanwhile, by splitting the first text for audio conversion into the plurality of first text segments of relatively short lengths, and converting the first text segments into corresponding audio segments, listening and reading flexibility can be improved, thereby enhancing user experience. In addition, each of the first text segments is converted into the corresponding audio segment, duration of each of the audio segments is relatively short, and all the audio segments are spliced together to form a complete audio corresponding to the first text. Meanwhile, the audio starting time of each of the audio segments in the complete audio is determined. Since each of the audio segments corresponds to the first text segment, the text starting position of each of the audio segments in the second text can be determined based on the first text segment and the second text, and the synchronization relationship between the audio starting time and the text starting position can be determined, thereby realizing synchronization of audio playing and text display.

BRIEF DESCRIPTION OF THE DRAWINGS

The accompanying drawings are incorporated in and constitute a part of the description, illustrate embodiments consistent with the present disclosure, and serve to explain the principles of the present disclosure together with the description.

In order to more clearly illustrate the technical solutions of the embodiments of the present disclosure or the prior art, the drawings that need to be used in the description of the embodiments or the prior art are briefly described below. Obviously, a person of ordinary skill in the art can obtain other drawings according to these drawings without involving any inventive effort.

DESCRIPTION OF EMBODIMENTS

In order to more clearly understand the above objects, features and advantages of the present disclosure, the aspects of the present disclosure are further described below. It should be noted that, in the case of no conflict, the embodiments of the present disclosure and the features in the embodiments may be combined with each other.

Numerous specific details are set forth in the following description to facilitate a sufficient understanding of the present disclosure, but the present disclosure may also be practiced otherwise than as described herein; obviously, the embodiments in the specification are only a part of the embodiments of the present disclosure rather than all of the embodiments.

A synchronization method for audio and text according to embodiments of the present disclosure is executed at a server, realizing a synchronization method for audio and text based on TTS (text-to-speech). The embodiment of the present disclosure can be applied to voice conversion and synchronization of a novel APP at the terminal, and a browser of the terminal displays voice conversion and synchronization of a text content and voice conversion and synchronization in other scenes, which is not limited in the embodiment of the present disclosure. By adopting the synchronization method according to the embodiments of the present disclosure, a high-tone-quality audio can be generated at the server. Meanwhile, user's requirements for synchronous reading of an audio and a text can be satisfied. In some embodiments, by spitting a first text for audio conversion, converting split first text segments into corresponding audio segments, and then synthesizing the audio segments into a complete audio, flexible splitting and conversion of the first text can be realized. Therefore, user's flexible requirements for reading and listening can be satisfied, thereby improving user experience.

A synchronization method and apparatus for audio and text, a device, and a medium according to embodiments of the present disclosure are described exemplarily with reference to FIG. 1 to FIG. 4.

Figure 1:
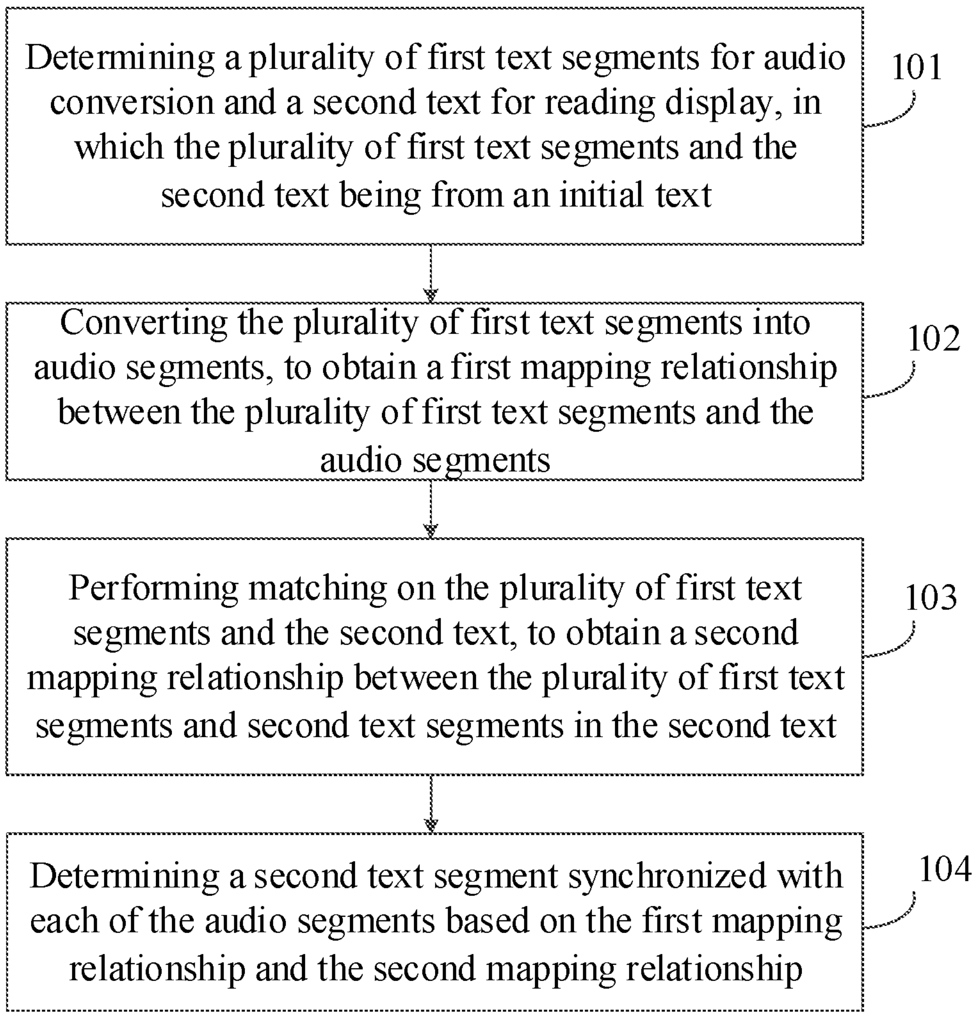
FIG. 1 is a schematic flowchart of a synchronization method for audio and text according to an embodiment of the present disclosure.

In some embodiments, FIG. 1 is a schematic flowchart of a synchronization method for audio and text according to an embodiment of the present disclosure. Referring to FIG. 1, the method may include actions at blocks 101 to 104:

At block 101, a plurality of first text segments for audio conversion and a second text for reading display are determined. The plurality of first text segments and the second text are from an initial text.

The initial text may be any text. For example, the initial text may be a text including one or more sentences, or a text including one or more paragraphs. Exemplarily, a description will be set forth by taking an example in which a user reads a novel at a terminal. The initial text may be a chapter original text or any text in the chapter original text. If the initial text is the chapter original text, the first text for audio conversion can also be referred to as a TTS original text or a TTS text, and the second text for reading display may also be referred to as a reading original text or a reading text.

In some embodiments, the first text segments are a part of the first text, and may be obtained by splitting the first text. In some embodiments, the first text segments may be obtained based on any text segments in the initial text, rather than being obtained by splitting the first text.

At block 102, the plurality of first text segments are converted into audio segments, to obtain a first mapping relationship between the plurality of first text segments and the audio segments.

In the embodiment, the first text segments are used for the audio conversion, the first text segments can be converted into the audio segments in a conversion manner in the related art, which will be omitted herein. The converted audio segments may be played by an audio device of the terminal, to realize reading of the first text segments.

In the embodiment, since the plurality of first text segments are obtained, the first text segments can be converted into the audio segments, to obtain the audio segments corresponding to the first text segments, which in turn establishes the first mapping relationship between the first text segments and the audio segments based on a conversion relationship between the first text segments and the audio segments. The first mapping relationship includes the plurality of first text segments and the audio segments corresponding to the plurality of first text segments.

At block 103, matching is performed on the plurality of first text segments and the second text, to obtain a second mapping relationship between the plurality of first text segment and the second text segment in the second text.

In the embodiment, since the first text segments and the second text are from the initial text, the first text segments correspond to a part of the content in the initial text, and the second text corresponds to all the content of the initial text. Therefore, a second text segment corresponding to the first text segments may be found in the second text. Further, in the embodiment, the second text segment corresponding to the first text segments is obtained by performing the matching on the first text segments with all the content of the second text.

In the embodiment, since the plurality of first text segments are obtained, the matching can be performed on the first text segments and the second text, to obtain the second text segment corresponding to each of the first text segments, to further establish the second mapping relationship between the first text segments and the second text segments in the second text. The second mapping relationship includes the plurality of first text segments and the second text segments corresponding to the plurality of first text segments.

At block 104, a second text segment synchronized with each of the audio segments is determined based on the first mapping relationship and the second mapping relationship.

In the embodiment, the first mapping relationship includes the plurality of first text segments and the audio segments corresponding to the plurality of first text segments, and the second mapping relationship includes the plurality of first text segments and the second text segments corresponding to the plurality of first text segments. Therefore, the second text segment corresponding to each of the audio segments can be determined based on the first mapping relationship and the second mapping relationship.

The second text segments are used for reading display, the audio segments are used for reading, and the audio segments corresponds to the second text segments. Therefore, the second text segment synchronized with each of the audio segments can be determined, to realize audio and text synchronization. Thus, it is possible to solve problems in which a matched text cannot be displayed or the displayed content is deviated from the reading content during reading due to different requirements for reading display and reading on chapter texts.

Figure 2:
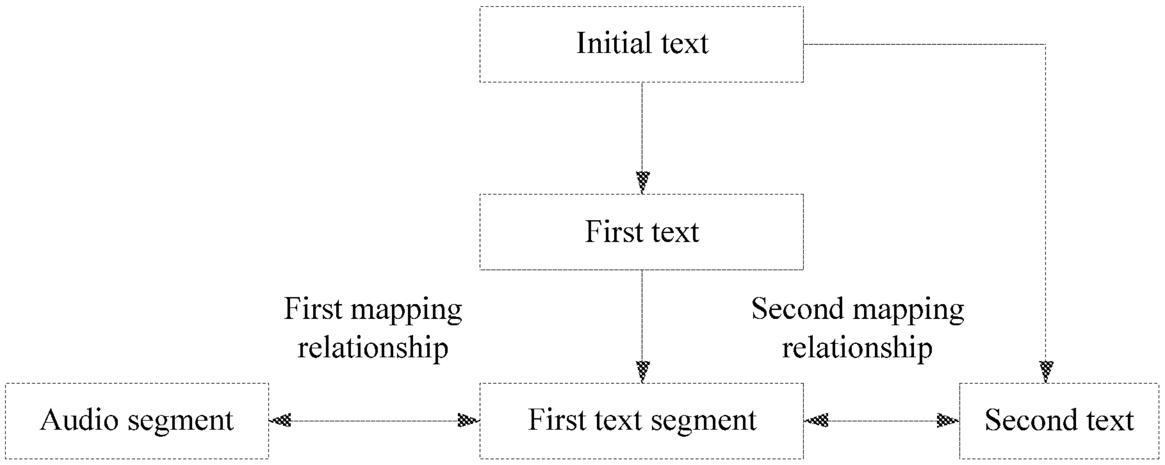
FIG. 2 is a flowchart of determining a first mapping relationship and a second mapping relationship in the scene shown in FIG. 1.

FIG. 2 is a flowchart of determining the first mapping relationship and the second mapping relationship in the scene shown in FIG. 1. In FIG. 2, the first text and the second text may be determined from the initial text. The first text is used for audio conversion, and the second text is used for reading display. The first text segments can be obtained by splitting the first text. The first text segments are converted into the audio segments, and the first mapping relationship between the first text segments and the audio segments can be obtained. The matching is performed on the first text segments and the second text, to obtain the second mapping relationship between the first text segments and the second text segments in the second text.

In some embodiments, the performing the matching the first text segments and the second text at block 103 may include: performing matching on each of the plurality of first text segments and the second text based on one or more symbols in each of the plurality of first text segments and one or more symbols in the second text. In some embodiments, the action at block 103 may include actions at blocks 1031 to 1035.

At block 1031, the one or more symbols in the second text are deleted to obtain a third text.

In some embodiments, all the symbols in the second text may be deleted to obtain the third text. That is, the third text is a non-symbol text corresponding to the second text. In this way, it is easy for later comparison of a temporary text segment.

For each of the first text segments, operations at blocks 1032 to 1035 may be performed.

At block 1032, the one or more symbols in the first text segment are deleted to obtain a first temporary text segment.

In some embodiments, all symbols in the first text segment may be deleted to obtain the first temporary text segment. That is, the first temporary text segment is a non-symbol text segment corresponding to the first text segment. In this way, it is easy for later comparison of the temporary text segment.

At block 1033, the third text is searched for a second temporary text segment same as the first temporary text segment.

In some embodiments, no symbol exists in the third text, and no symbol exists in the first temporary text segment. Thus, by comparing the first temporary text segment with the third text, the second temporary text segment same as the first temporary text segment can be found, and no symbol exists in the second temporary text segment.

At block 1034, the second text is searched for a first symbol previous to the second temporary text segment and a second symbol following the second temporary text segment.

In some embodiments, the third text is a non-symbol text corresponding to the second text. After the second temporary text segment is determined in the third text, based on a correspondence between the third text and the second text, it is possible to search the second text for the symbols previous to the second temporary text segment and the symbol following the second temporary text segment, i.e., for the first symbol previous to the second temporary text segment and the second symbol following the second temporary text segment.

At block 1035, the second text segment in the second text that matches with the first text segment is determined based on the first symbol and the second symbol.

Therefore, actions at blocks 1032 to 1035 may be performed on each of the first text segments to obtain the second mapping relationship between the first text segments and the second text segments in the second text.

In some embodiments, the determining, based on the first symbol and the second symbol, the second text segment in the second text that matches with the first text segment at block 1035 includes actions at blocks 201 to 203.

At block 201, a third symbol previous to the first temporary text segment and a fourth symbol following the first temporary text segment are determined based on the first text segment. In some embodiments, the first temporary text segment is obtained by deleting all symbols in the first text segment. Thus, the symbol previous to the respective first temporary text segment and the symbol following the respective first temporary text segment can be determined based on the first text segment. That is, the third symbol previous to the first temporary text segment and the fourth symbol following the first temporary text segment can be determined.

At block 202, matching is performed on the first symbol and the third symbol and on the second symbol and the fourth symbol, respectively.

In the embodiment, matching is performed on the symbol previous to the second temporary text segment and the symbol following the second temporary text segment as well as the symbol previous to the first temporary text segment and the symbol following the first temporary text segment. In an example, matching is performed on the first symbol and the third symbol, and matching is performed on the second symbol and the fourth symbol.

At block 203, the second text segment in the second text that matches with the first text segment is determined based on a result of the matching.

In the embodiment, the result of the matching may include the matching of the previous and following symbols, only the matching of the previous symbol, or only the matching of the following symbol, or the matching of none of the previous and following symbols. Based on different result of the matching, different second text segments matching with the first text segment can be determined.

In some embodiments, the determining, based on the result of the matching, the second text segment in the second text that matches with the first text segment at block 203 includes: determining a starting position of the second text segment as the first symbol and an ending position of the second text segment as the second symbol, when the result of the matching indicates that the first symbol is same as the third symbol and the second symbol is same as the fourth symbol; determining the starting position of the second text segment as the first symbol and the ending position as an end of the second text segment, when the result of the matching indicates that the first symbol is same as the third symbol and the second symbol is different from the fourth symbol; determining the starting position of the second text segment as a beginning of the second text segment and the ending position as the second symbol, when the result of the matching indicates that the first symbol is different from the third symbol and the second symbol is same as the fourth symbol; and determining the starting position of the second text segment as the beginning of the second text segment and the ending position as the end of the second text segment, when the result of the matching indicates that the first symbol is different from the third symbol and the second symbol is different from the fourth symbol.

In some embodiments, the searching the third text for the second temporary text segment same as the first temporary text segment at block 1033 may include performing actions at blocks 301 to 303 when no second temporary text segment same as the first temporary text segment is found in the third text.

At block 301, the first text segment is merged with a next first text segment to obtain a merged text segment.

In the embodiment, there are the plurality of first text segments, and the plurality of first text segments are from the same initial text. Further, the plurality of first text segments may be obtained by splitting the first text, and the first text is a text for audio conversion obtained based on the initial text. It can be seen that there is no same content, i.e., duplicate content among the plurality of first text segments, and the plurality of first text segments have an order determined based on a sequence of splitting the first text.

In the embodiment, the first text segment and the next first text segment are substantially two adjacent text segments. Thus, the first text segment and the next first text segment can be merged to obtain the merged text segment.

At block 302, an ending position of a previous first text segment to the first text segment in the second text is determined as a starting position of the merged text segment in the second text.

At block 303, an ending position of a next first text segment in the second text is determined as an ending position of the merged text segment in the second text.

It can be seen that, based on the ending position of the previous first text segment to the first text segment and the ending position of the next first text segment, the starting position and the ending position of the merged text segment in the second text can be determined. Thus, a second mapping relationship between the merged text segment and the second text segment in the second text can be determined, and the starting position and the ending position of the second text segment are the starting position determined at block 302 and the ending position determined at block 303.

In order to describe "performing matching on the first text segments and the second text to obtain the second mapping relationship between the first text segments and the second text segment in the second text" at block 103 more clearly, an example is illustrated by with reference to actions at blocks 1031 to 1035.

Since the first text segments are used for the audio conversion, and for ease of description, the first text segments are described as a TTS (Text-To-Speech) sentence. Since the second text is used for the reading display, and for ease of description, the second text is described as a reading chapter text. In the embodiment, matching is performed on the TTS sentence and the reading chapter text, and a total technical concept thereof is in that a position of non-symbol content of the TTS sentence in non-symbol content of the reading chapter text is found out firstly, and then a position of a beginning symbol and an end symbol of the TTS sentence in the reading chapter text are found out.

In an example, at block 1031, all symbols in the reading chapter text are deleted to obtain the non-symbol content of the reading chapter text.

At block 1032, all symbols in the TTS sentence are deleted to obtain the non-symbol content of the TTS sentence.

At block 1033, the position of the non-symbol content of the TTS sentence in the non-symbol content of the reading chapter text is found to obtain a second temporary text segment with the same non-symbol content as the TTS sentence.

At block 1034, a beginning symbol and an end symbol of the second temporary text segment in the reading chapter text are found.

At block 1035, positions of the beginning symbol and the end symbol of the TTS sentence in the reading chapter text are determined. When the beginning symbol and the end symbol of the TTS sentence are same as the beginning symbol and the end symbol of the second temporary text segment in the reading chapter text, the beginning and end symbols of the second temporary text segment in the reading chapter text are determined as beginning and end symbols of a reading sentence matching with the TTS sentence; otherwise, the reading sentence is defined by a position of a beginning or an ending of the sentence.

For example, taking a case where a reading chapter text is "ABC. DEF, GHI." as an example, when it is necessary to found a position of a TTS sentence "DEF, GHI." in the reading chapter text, symbols are firstly removed from the reading chapter text and the TTS sentence to obtain ABCDEFGHI and DEFGHI. Then, a position of DEFGHI in the reading chapter text is found first, then symbols previous to and following the non-symbol content DEFGHI of the TTS sentence are found to determine whether these symbol exist at a corresponding position in the reading chapter text. When there are the symbols previous to and following the non-symbol content DEFGHI, a reading sentence matching with the TTS sentence is defined by the symbols; otherwise, the reading sentence corresponding thereto is defined by a position of a beginning or an ending of the sentence.

A TTS sentence for which no matching position is found is merged with a following TTS sentence. If the TTS sentence contains a punctuation mark and there is no matching sentence in the reading chapter text, the TTS sentence is merged with a following TTS sentence containing a punctuation mark, to obtain a merged sentence. An ending position of a previous TTS sentence to the TTS sentence in the reading chapter text is determined as a starting position of the TTS sentence in the reading chapter text, and an ending position of a following TTS sentence of the TTS sentence in the reading chapter text is determined as an ending position of the merged sentence in the reading chapter text.

For example, a description will be set forth taking the reading chapter text being "ABC. DE, F. H, I." and the TTS sentence being "ABC.", "DE, F.", "G.", "H, I." as an example. Based on the step 1 and the step 2 describe above, a corresponding reading sentence to the TTS sentence "ABC." in the reading chapter text is "ABC.", and a corresponding reading sentence of the TTS sentence "DE, F." in the reading chapter text is "DE, F.".

For the TTS sentences "G." and "H, I.", since the TTS sentence "G." does not have no-symbol text content corresponding thereto in the reading chapter text, the TTS sentences "G." and "H, I." are merged with the next TTS sentence "H, I.", to obtain a merged TTS sentence "G. H, I.", and a reading sentence corresponding to the merged TTS sentence can be found in the reading chapter text, namely "H, I.", that is, the TTS sentence "G., H, I." matches with the reading sentence "H, I.".

In the above embodiments, when the solution is applied to synchronization of audio and text of a plurality of chapters, a character position definition and a chapter paragraph labeling can be set in a following manner.

For the character position definition, a position of a character in a chapter is defined as a y-th character in the x-th paragraph, so that a client can quickly and accurately found a position of the character in the chapter.

For the chapter paragraph labeling, a chapter text is generally segmented by a <p></p> label, and the <p></p> label in the chapter text is transmitted to the client by a server after numbered in sequence. Illustratively, a format may be: <p "idx"="1"> sentence 1. Sentence 2. Sentence 3. </p><p "idx"="2"> sentence 4. Sentence 5. </p>, to facilitate the client searching a paragraph.

In some embodiments, the determining the plurality of first text segments for audio conversion and the second text for reading display at block 101 includes actions at blocks 1011 and 1012.

At block 1011, an initial text is obtained, and the first text for audio conversion and the second text for reading display are determined based on the initial text.

In the embodiment, the initial text is obtained by the server, and the initial text is converted into the first text and the second text based on a certain normalization.

In some embodiments, the determining the first text for audio conversion and the second text for reading display based on the initial text further includes: performing first text normalization processing on the initial text to obtain the first text; and performing second text normalization processing on the initial text to obtain the second text. The first text normalization processing on the initial text may be first performed to obtain the first text, or the second text normalization processing on the initial text may be first performed to obtain the second text, or the first text normalization processing on the initial text and the second text normalization processing on the initial text may be performed in parallel, which is not limited in the embodiment of the present disclosure.

The first text normalization processing includes one or more of deleting target content satisfying a first predetermined condition from the initial text and performing punctuating on a sentence exceeding a length threshold. For example, the first predetermined condition may include, but is not limited to, content that cannot be read such as emoticons, characters that cannot be pronounced. Non-standard punctuation marks are for example: two commas, one of which needs to be deleted, and a space needs to be deleted, which may be adaptively replaced with other punctuation marks. The first predetermined condition does not include a normalized punctuation mark, since the normalized punctuation mark may influence the pronunciation. As a result, the normalized punctuation mark is not deleted.

The content which cannot be read in the initial text can also be understood as content that cannot be converted into audio in the initial text. By deleting the content which cannot be read in the initial text, in the later converting of the text into the audio, data processing amount can be reduced. Meanwhile, a problem of error conversion can be avoided. Non-standard punctuation marks include a punctuation mark which does not accord with general writing-manner requirements, and also include a punctuation mark which has interference on later text splitting. By deleting the non-standard punctuation marks in the initial text, later text splitting can be facilitated. The length threshold can be understood as a length upper limit value conforming to a reading sentence punctuating habit. When a length of one sentence exceeds the length threshold, if the sentence is converted into a same audio segment as a whole, the audio segment will be too long, and a user experience is poor. By performing the punctuating on the sentence exceeding the length threshold, the converted audio segments are all relatively short, and the user experience is improved.

Therefore, by performing one or more operations on the sentences including deleting the content which cannot be read in the initial text, deleting the non-standard punctuation mark and performing the puncturing the sentence exceeding the length threshold, the splitting and the audio conversion can be performed on the processed first text, thereby improving the user experience.

The second text normalization processing includes deleting target content satisfying a second predetermined condition from the initial text. The second predetermined condition includes, but is not limited to, content that cannot be read, such as emoticons and content that may need to be hidden based on the service setting.

During the second text normalization processing, by deleting the content which cannot be read in the initial text, a text which is convenient to be read and conforms to the general reading habit can be obtained, such that it facilitates to form the second text satisfying the reading display requirement.

Exemplarily, in the first text normalization processing, the content which cannot be read and/or the non-standard punctuation marks can be detected, and a deletion operation is performed on the detected content and/or the detected non-standard punctuation marks. The length of the sentence can be detected, and when the length of the sentence exceeds the length threshold, the punctuating is performed on the sentence. Similarly, during the second text normalization processing, the content which cannot be read can be detected, and the deletion operation is performed on the detected content.

It should be noted that, when the first text normalization processing includes a plurality of processing operations, a sequence of the operations is not limited.

At block 1012, the first text is split into the plurality of first text segments.

The first text segments may be referred to as a TTS sentence. The text length of the first text is relatively long, and is split to obtain a plurality of corresponding first text segments. Thus, a length of the first text segment is relatively short. After the first text segments are converted into the audio segments, duration of each of the audio segments is relatively short.

In some embodiments, the splitting the first text into the plurality of first text segments may include: determining one or more symbols in the first text, and splitting the first text based on the one or more symbols, to obtain the plurality of first text segments.

In some embodiments, the splitting the first text into the first text segment may include performing the splitting based on punctuation marks, based on the text chapter and the length of the sentence thereof, which is not limited in the embodiment of the present disclosure.

For example, a plurality of symbols in the first text include all punctuation marks that punctuate the first text, for example, it may include a caesura (.), a comma (,), a full stop (.), a question mark (?), an exclamation (!), an ellipsis ( . . . ), and other symbols known to those skilled in the art.

On this basis, the symbol is used as a demarcation point of an adjacent first text segment, achieving splitting of the first text into the plurality of first text segments.

It should be noted that when the initial text includes a sentence having a length exceeding the length threshold, a plurality of symbols in the first text further include a symbol that punctuates the sentence.

In this case, an audio and text synchronous reading based on a server-side TTS can be realized, thereby generating the high-tone-quality audio by using the server-side TTS. Meanwhile, the user's requirements for the synchronous reading of the audio and the text, and using different normalization rules for the chapter original text is also supported for the TTS and a reader, leading to high adaptability. Herein, the reader is used for realizing a function of displaying the second text.

It should be noted that the number of the first text segments obtained by splitting the first text can be determined based on the length of the first text and distribution of the symbols (i.e., punctuation marks) therein, and it can be set according to duration requirement of the audio segment, which is not limited in the embodiments of the present disclosure.

In some embodiments, the synchronization method for audio and text further includes actions at blocks 1021 and 1022 subsequent to the plurality of first text segments being converted into the audio segments at block 102.

At block 1021, the audio segments are synthesized into a complete audio, and an audio starting time of each of the audio segments in the complete audio is determined.

In the embodiment, the audio segments can be spliced based on the sequence of the first text segments corresponding thereto in the first text, to obtain the complete audio. Further, the audio starting time of each of the audio segments in the complete audio can be determined based on the duration of each of the audio segments.

Exemplarily, a splicing manner for obtaining the complete audio by splicing the audio segments may adopt any splicing manner known to a person skilled in the art, which is not limited in the embodiment of the present disclosure.

At block 1022, a synchronization relationship between the audio starting time and a text starting position of the second text segment in the second text is determined based on the second text segment synchronized with each of the audio segments.

In the embodiment, based on the second text segment synchronized with each of the audio segments, the audio starting time of each of the audio segments in the complete audio, and the text starting position of the second text segment in the second text, the synchronization relationship between the audio starting time and the text starting position of the second text segment in the second text can be determined, achieving synchronization of audio playing and text display.

Exemplarily, a description will be set forth taking the initial text corresponding to one complete chapter content and the first text segment being a sentence as an example. The server can split the complete chapter content in units of sentences, convert it into the audio segment in units of sentences and splice the audio segments together, to obtain a complete audio of the complete chapter and a time point (i.e., the audio starting time) of each of the audio segments. There is a first mapping relationship between the audio segments and the sentence (i.e., the first text segment). Matching is performed on the split sentence (i.e., the first text segment) and the sentence (i.e., the second text segment) in the second text for reading display, to find a second mapping relationship. Finally, the time point of the audio segment corresponds to the sentence in the second text, to realize audio and text synchronization.

In some embodiments, after the synchronization relationship between the audio starting time and the text starting position of the second text segment in the second text is determined at block 1022, an association relationship is obtained by associating the complete audio, the second text, and the synchronization relationship.

Figure 3:
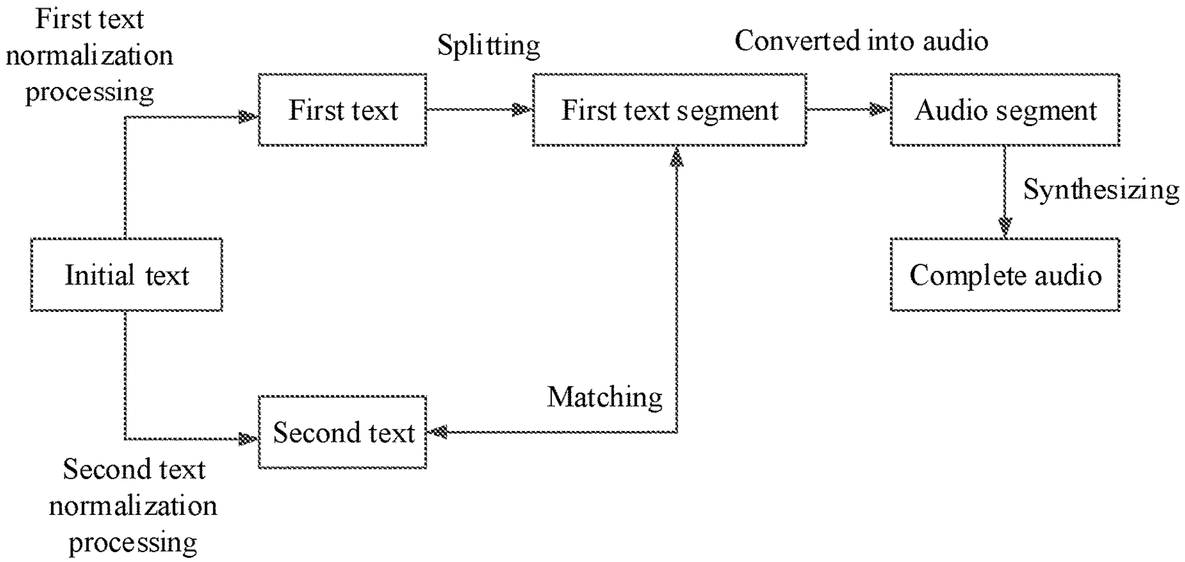
FIG. 3 is a schematic flowchart of another synchronization method for audio and text according to an embodiment of the present disclosure.

In combination with the actions at blocks 1011, 1012, 1021 and 1022, FIG. 3 is a schematic flowchart of another synchronization method for audio and text according to an embodiment of the present disclosure. The method includes first to seventh steps.

In the first step 1, normalization processing is performed on the initial text to obtain a first text and a second text.

Exemplarily, the first step may include: performing the first text normalization processing on the chapter original text. For example, at least one of operations of deleting content which cannot be read, removing non-standard punctuation marks, and performing punctuating on overlong sentences is performed to obtain a TTS chapter text.

Exemplarily, the step further includes: performing the second text normalization processing on the chapter original text. For example, the content which cannot be read is removed to obtain a readable chapter text.

In the second step, the first text is split into the first text segment.

Exemplarily, the first step may include: splitting the TTS chapter text into sentences based on the punctuation marks in the TTS chapter text.

In the third step 3, the first text segments are converted into audio segments.

Exemplarily, the third step may include sequentially converting the sentence into the audio, obtaining a series of audio segments corresponding to each sentence, and determining a first mapping relationship.

In the fourth step 4, the audio segments is spliced together, i.e., synthesized together, to obtain a complete audio corresponding to the whole chapter, and to obtain a starting time point of the audio segment corresponding to each sentence, that is, to obtain the audio starting time. Therefore, the complete audio corresponding to the chapter original text, a text of each sentence in the chapter, and a corresponding audio starting point are generated. Then, the server needs to correspond the audio starting point to the starting point of the corresponding content in the second text of the chapter reader. Exemplarily, the operations includes the fifth to seventh steps.

In the fifth step 5, based on the above matching, the position of the TTS sentence in the reading chapter text is found based on a matching algorithm. That is, a second mapping relationship is determined.

In the sixth step 6, a synchronization relationship between the audio starting time and the text starting position in the reading chapter text is obtained based on the first mapping relationship and the second mapping relationship.

In the seventh step 7, the complete audio corresponding to the chapter original text, the reading chapter text, and the synchronous relationship between the audio starting time and the reading chapter text sentence starting point (that is, the text starting position) are transmitted to the client, and are output and displayed at the client.

In this way, in some embodiments, the method further includes: obtaining an association relationship by associating the complete voice, the second text, and the synchronization relationship.

Based on the association relationship, the synchronized audio and text can be output at the client, and audio granularity can match with the sentence, so that the user experience is improved.

With the synchronization method for audio and text according to embodiments of the present disclosure, the TTS is carried out at the server. By splitting the chapter content into sentences, the sentences are converted into audio segments one by one and then merged into the complete audio, to find out the corresponding relationship between the audio starting time of the audio segment and the TTS sentence. Meanwhile, in combination with the matching algorithm of the TTS sentence and the reader text, the corresponding relationship between the audio starting time and the reader text sentence is finally found, so that the synchronization of the audio starting time and the text starting position can be realized. Therefore, the user's requirement for granularity accuracy of the audio can be satisfied while while realizing high-tone-quality audio, thereby improving the user experience.

In at least one embodiment of the present disclosure, texts for audio conversion and reading display respectively can be correspondingly generated based on the same initial text. The first text for audio conversion is split into first text segments with relatively short lengths, and each of the first text segments is converted into a corresponding audio segment. As a result, the duration of each of the audio segments is relatively short, and all the audio segments are spliced together to generate a complete audio corresponding to the first text. Meanwhile, the audio starting time of each of the audio segments in the complete audio is determined. Since each of the audio segment corresponds to first text segment, based on the first text segment and the second text, the text starting position of each of the audio segments in the second text can be determined, and the synchronization relationship between the audio starting time and the text starting position can be determined. Therefore, by splitting the first text into a plurality of first text segments and correspondingly converting them into the audio segments, listening and reading flexibility is improved while realizing audio and text synchronization. Further, the matching granularity of the progress of the audio and the text is fine to the first text segment such as a sentence, so that the user experience is improved.

Figure 4:
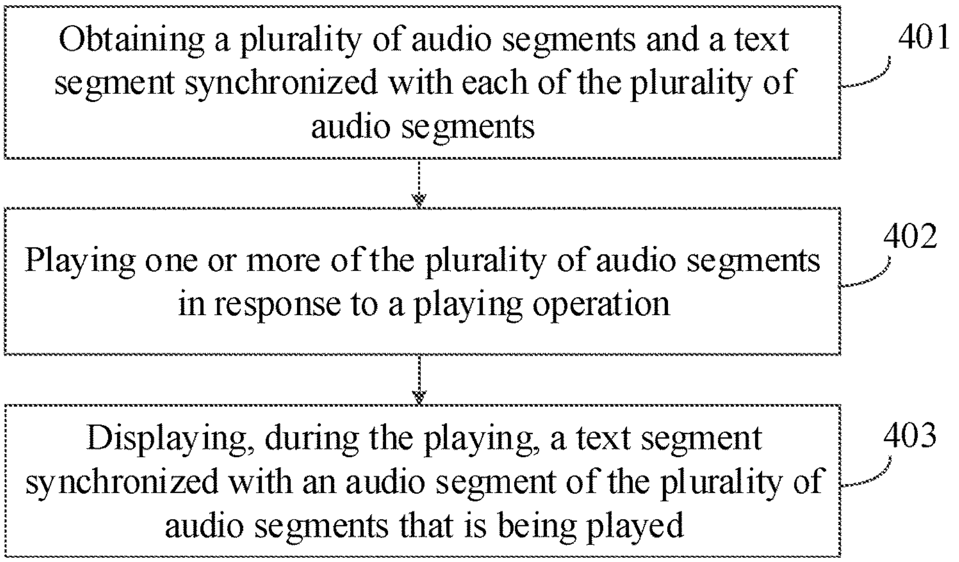
FIG. 4 is a schematic flowchart of yet another synchronization method for audio and text according to an embodiment of the present disclosure.

FIG. 4 is a schematic flowchart of another synchronization method for audio and text according to an embodiment of the present disclosure. In the embodiment, an execution body of the method is the client of the reader, the client is installed in a user device, and the user device can be any type of electronic device, for example, a mobile device such as a smart phone, a tablet computer, a notebook computer and intelligent wearable device, and for other example, a fixing device such as a desktop computer, a smart television.

At block 401, a plurality of audio segments and a text segment synchronized with each of the plurality of audio segments are obtained. In the embodiment, the plurality of audio segments and the second text segment synchronized with each of the plurality of audio segments can be determined by the synchronization method for audio and text shown in the FIG. 1, to obtain the plurality of audio segments and the text segment synchronized with each of the audio segments. At block 402, one or more audio segments are played in response to a playing operation. In the embodiment, the reader can provide a user interface, and a playing control is displayed on the user interface. A user may click the playing control to play the audio segments. Correspondingly, the reader can play the one or more audio segments in response to the playing operation (a clicking operation of the user).

In some embodiments, the user may select different text segments, then click the playing control to play the audio segments corresponding to the selected text segments. Correspondingly, the reader can determine a target text segment in response to the selected operation, and then play, in response to the playing operation, the audio segment corresponding to the target text segment.

At block 403, a text segment synchronized with an audio segment of the plurality of audio segments that is being played is displayed during the playing, so that the matched text can be displayed during reading, and there is no deviation between the displayed text and the reading content.

Figure 5:
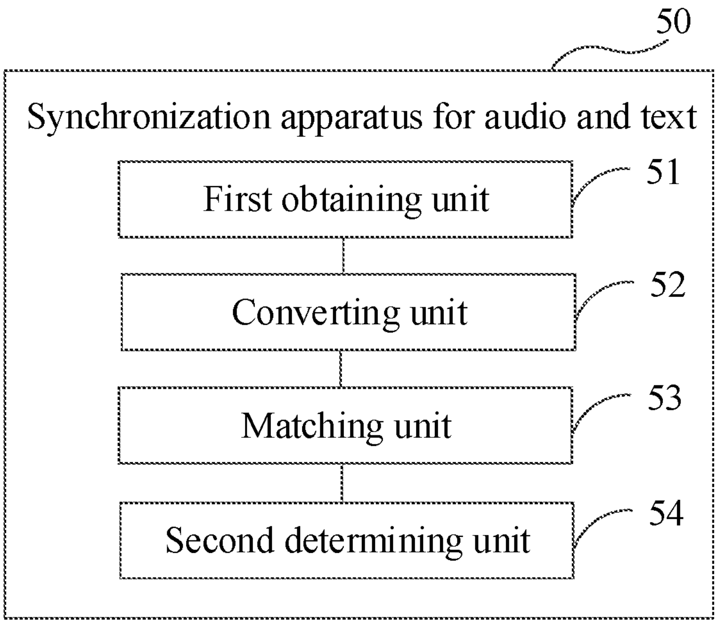
FIG. 5 is a structural schematic diagram of a synchronization apparatus for audio and text according to an embodiment of the present disclosure.

FIG. 5 is a structural schematic diagram of a synchronization apparatus for audio and text 50 according to an embodiment of the present disclosure. The apparatus may be applied to a server. Referring to FIG. 5, the apparatus may include a first determining unit 51, a converting unit 52, a matching unit 53, and a second determining unit 54.

The first determining unit 51 is configured to determine a plurality of first text segments for audio conversion and a second text for reading display, and the plurality of first text segments and the second text are from an initial text.

The converting unit 52 is configured to convert the plurality of first text segments into audio segments, to obtain a first mapping relationship between the plurality of first text segments and the audio segments.

The matching unit 53 is configured to perform matching on the plurality of first text segments and the second text, to obtain a second mapping relationship between the plurality of first text segments and second text segments in the second text.

The second determining unit 54 is configured to determine a second text segment synchronized with each of the audio segments based on the first mapping relationship and the second mapping relationship.

In some embodiments, the performing, by the matching unit 53, matching on each of the plurality of first text segments with and the second text includes: performing, by the matching unit 54, matching on each of the plurality of first text segments with and the second text based on one or more symbols in each of the plurality of first text segments and one or more symbols in the second text.

In some embodiments, the performing, by the matching unit 53, matching on each of the plurality of first text segments with and the second text based on one or more symbols in each of the plurality of first text segments and one or more symbols in the second text includes: deleting, by the matching unit 53, the one or more symbols in the second text to obtain a third text; and for each of the plurality of first text segments: deleting, by the matching unit 53, the one or more symbols in the first text segment to obtain a first temporary text segment; searching, by the matching unit 53, from the third text for a second temporary text segment same as the first temporary text segment; searching from the second text for a first symbol previous to the second temporary text segment and a second symbol next following to the second temporary text segment; and determining, by the matching unit 53 based on the first symbol and the second symbol, the second text segment in the second text that matches with the first text segment.

In some embodiments, the determining, by the matching unit 53 based on the first symbol and the second symbol, the second text segment in the second text that matches with the first text segment includes: determining, by the matching unit 53 based on the first text segment, a third symbol previous to the first temporary text segment and a fourth symbol following the first temporary text segment; performing, by the matching unit 53, matching on the first symbol and the third symbol and on the second symbol and the fourth symbol, respectively; and determining, by the matching unit 53 based on a result of the matching, the second text segment in the second text that matches with the first text segment.

In some embodiments, the determining, by the matching unit 53 based on the result of the matching, the second text segment in the second text that matches with the first text segment includes: determining a starting position of the second text segment as the first symbol and an ending position of the second text segment as the second symbol, when the result of the matching indicates that the first symbol is same as the third symbol and the second symbol is same as the fourth symbol; determining the starting position of the second text segment as the first symbol and the ending position as an end of the second text segment, when the result of the matching indicates that the first symbol is same as the third symbol and the second symbol is different from the fourth symbol; determining that the starting position of the second text segment as a beginning of the second text segment and the ending position as the second symbol, when the result of the matching indicates that the first symbol is different from the third symbol and the second symbol is same as the fourth symbol; and determining the starting position of the second text segment as the beginning of the second text segment and the ending position as the end of the second text segment, when the result of the matching indicates that the first symbol is different from the third symbol and the second symbol is different from the fourth symbol.

In some embodiments, the matching unit 53 is further configured to: merge the first text segment with a next first text segment to obtain a merged text segment, when no second temporary text segment same as the first temporary text segment is found in the third text; determine an ending position of a previous first text segment to the first text segment in the second text to be a starting position of the merged text segment in the second text; and determine an ending position of a next first text segment in the second text to be an ending position of the merged text segment in the second text.

In some embodiments, the determining, by the first determining unit 51, the plurality of first text segments for audio conversion and the second text for reading display includes: obtaining, by the first determining unit 51, the initial text, and determining, by the first determining unit 51 based on the initial text, the first text for the audio conversion and the second text for the reading display; and splitting, by the first determining unit 51, the first text into the plurality of first text segments.

In some embodiments, the determining, by the first determining unit 51 based on the initial text, the first text for audio conversion and the second text for reading display includes: performing first text normalization processing on the initial text to obtain the first text; and performing second text normalization processing on the initial text to obtain the second text.

In some embodiments, the first text normalization processing incudes one or more of: deleting target content satisfying a first predetermined condition from the initial text; and performing punctuating on a sentence exceeding a length threshold. The second text normalization processing incudes deleting target content satisfying a second predetermined condition from the initial text.

In some embodiments, the splitting, by the first determining unit 51, the first text into the plurality of first text segments includes: determining one or more symbols in the first text, and splitting the first text based on the one or more symbols, to obtain the plurality of first text segments.

In some embodiments, the apparatus further includes a synthesizing unit and a third determining unit that are not shown in FIG. 5

The synthesizing unit is configured to synthesize the audio segments into a complete audio, and determine an audio starting time of each of the audio segments in the complete audio.

The third determining unit is configured to determine, based on the second text segment synchronized with each of the audio segments, a synchronization relationship between the audio starting time and a text starting position of the second text segment in the second text.

In some embodiments, the third determining unit is further configured to obtaining an association relationship by associating the complete audio, the second text, and the synchronization relationship.

The detailed description of each unit of the synchronization apparatus for audio and text synchronization 50 disclosed by the embodiment can be described in detail with reference to the detailed description of each step of the synchronization method for audio and text shown in FIG. 1, and the description thereof in detail will be omitted herein.

Figure 6:
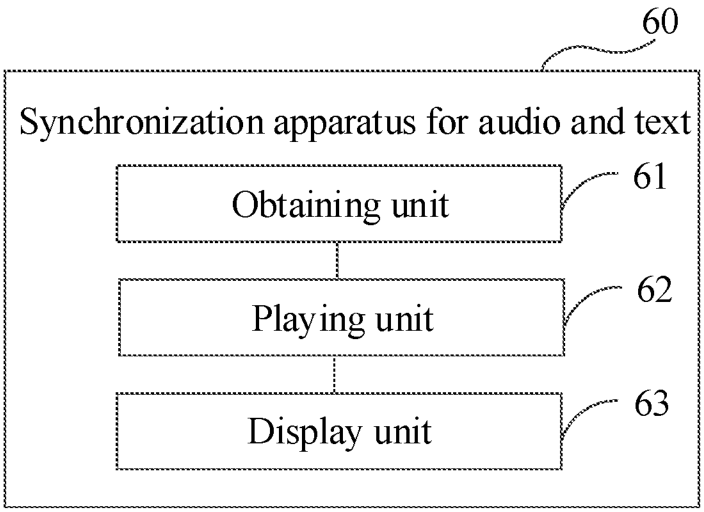
FIG. 6 is a structural schematic diagram of another synchronization apparatus for audio and text according to an embodiment of the present disclosure.

FIG. 6 is a structural schematic diagram of a synchronization apparatus for audio and text 60 according to an embodiment of the present disclosure. The apparatus may be applied to a client of a reader. Referring to FIG. 6, the apparatus may include: an obtaining unit 61 to obtain a plurality of audio segments and a text segment synchronized with each of the audio segments; a playing unit 62 configured to play one or more of the audio segments in response to a playing operation; and a display unit 63 configured to display, during the playing, a text segment synchronized with an audio segment of the plurality of audio segments that is being played.

The detailed description of each unit of the synchronization apparatus for audio and text 60 disclosed by the embodiment can be described in detail with reference to the detailed description of each step of the synchronization method for audio and text shown in FIG. 4, and the description thereof in detail will be omitted herein.

The present disclosure further provides an electronic device. The electronic device includes a processor and a memory. The processor is configured to perform, by calling a program or an instruction stored on the memory, the method as described in any one of the above embodiments. Therefore, the electronic device also has beneficial effects of the method and the apparatus described above, and the same parts may be understood by referring to explanation description of the above method and apparatus, and the description thereof in detail will be omitted herein.

Figure 7:
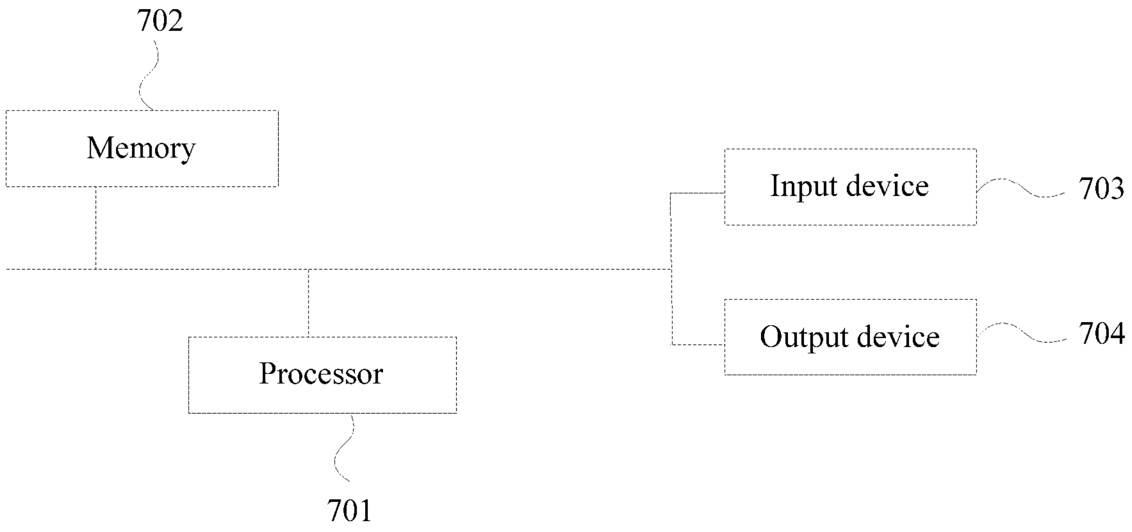
FIG. 7 is a schematic diagram of an electronic device according to an embodiment of the present disclosure.

In some embodiments, FIG. 7 is a structural schematic diagram of an electronic device according to an embodiment of the present disclosure. Referring to FIG. 7, the electronic device includes one or more processors 701 and a memory 702. For example, one processor 701 is shown in FIG. 7.

The electronic device may further include an input device 703 and an output device 704.

The processor 701, the memory 702, the input device 703, and the output device 704 in the electronic device may be connected by a bus or in other manners, and the connection manner is exemplarily shown in FIG. 7 by taking a bus connection as an example.

The memory 702 may be used as a non-transitory computer-readable storage medium for storing a software program, a computer-executable program and a module, such as a program instruction/module/unit (for example, the obtaining unit 201, the first processing unit 202, the second processing unit 203, and the third processing unit 204 shown in FIG. 5) corresponding to the above-mentioned method of an application program in the embodiments of the present disclosure. The processor 701 is configured to perform, when running a software program, an instruction, a unit, and a module stored in the memory 702, various functional applications and data processing of the server. That is, the method as described above can be realized.

The memory 702 may include a storage program area and a storage data area. The storage program area can store an operating system and an application program required by at least one function, and the storage data area can store data created based on the use of the electronic device and the like.

In addition, the memory 702 may include a high-speed random-access memory. The memory 702 may further include a non-transitory memory, such as at least one magnetic disk storage device, a flash memory device, or other non-transitory solid-state memory devices.

In some embodiments, the memory 702 may include a memory remotely located from the processor 701, and the remote memory may be connected to a terminal device over a network. Examples of the network include, but are not limited to, the Internet, an enterprise intranet, a local area network, a mobile communication network, and combinations thereof.

The input device 703 may be configured to receive input digital or character information and generate key signal input related to user setting and function control of the electronic device.

The output device 704 may include a display device such as a display screen.

Embodiments of the present disclosure further provide a non-transitory computer readable storage medium. The non-transitory computer readable storage medium has a program or an instruction stored thereon. The program or the instruction causes the computer to perform the method as described above.

Through the description of the embodiment, a person skilled in the art can clearly understand that the method according to the embodiments of the present disclosure can be realized by means of software and necessary general hardware, and certainly it can also be realized through hardware, but the former is a better implementation mode under many conditions. Based on such understanding, an essential part of the above-mentioned method related technical solutions of the embodiments of the present disclosure or a part that makes contribution to the related art may be embodied in the form of a software product, and the computer software product may be stored in a computer-readable storage medium, such as a floppy disk of a computer, a Read-Only Memory (ROM), a Random Access Memory (RAM), a Flash memory (Flash), a hard disk or an optical disk, etc., and it includes several instructions for enabling a computer device (which may be a personal computer, a server, or a network device, etc.) to perform each of the methods of the embodiments of the present disclosure.

It should be noted that, in this description, relational terms such as "first" and "second" are merely used to distinguish one entity or operation from another entity or operation, without necessarily requiring or implying any such actual relationship or order among these entities or operations. Moreover, the terms "including", "comprising", or any other variant thereof are intended to cover a non-exclusive inclusion, such that a process, method, article, or device including a series of elements includes not only those elements, but also includes other elements not explicitly listed, or includes elements inherent to such a process, method, article, or device. In the absence of more restrictions, elements limited by a sentence "includes one . . . " don't exclude that other identical elements are also present in the processes, methods, articles, or devices that include the elements.

The above are merely specific embodiments of the present disclosure, so that those skilled in the art can understand or implement the present disclosure. Various modifications to these embodiments will be apparent to those skilled in the art, and general principles defined herein may be implemented in other embodiments without departing from the spirit or scope of the present disclosure. Thus, the present disclosure will not be limited to these embodiments described herein, but be accorded the widest scope consistent with the principles and novel features disclosed herein.

What is claimed is:

1. A synchronization method for audio and text, performed by a server, comprising:

determining a plurality of first text segments for audio conversion and a second text for reading display, the plurality of first text segments and the second text being from an initial text;

converting the plurality of first text segments into audio segments playable by an audio device of a terminal, to obtain a first mapping relationship between the plurality of first text segments and the audio segments;

performing matching on the plurality of first text segments and the second text, to obtain a second mapping relationship between the plurality of first text segments and second text segments in the second text; and determining a second text segment synchronized with each of the audio segments based on the first mapping relationship and the second mapping relationship;

sending each of the audio segments and the second text segment synchronized with each of the audio segments to a client installed on the terminal, to enable the client to play each of the audio segments via the audio device while displaying the second text segment synchronized with the played audio segment on a user interface of the client.

2. The method according to claim 1, wherein the performing the matching on each of the plurality of first text segments and the second text comprises:

performing matching on each of the plurality of first text segments and the second text based on one or more symbols in each of the plurality of first text segments and one or more symbols in the second text.

3. The method according to claim 2, wherein the performing the matching on each of the plurality of first text segments and the second text based on one or more symbols in each of the plurality of first text segments and one or more symbols in the second text comprises:

deleting the one or more symbols in the second text to obtain a third text; and for each of the plurality of first text segments:

deleting the one or more symbols in the first text segment to obtain a first temporary text segment;

searching the third text for a second temporary text segment same as the first temporary text segment;

searching the second text for a first symbol previous to the second temporary text segment and a second symbol following the second temporary text segment; and determining, based on the first symbol and the second symbol, the second text segment in the second text that matches with the first text segment.

4. The method according to claim 3, wherein the determining, based on the first symbol and the second symbol, the second text segment in the second text that matches with the first text segment comprises:

determining, based on the first text segment, a third symbol previous to the first temporary text segment and a fourth symbol following the first temporary text segment;

performing matching on the first symbol and third second symbol and on the second symbol and the fourth symbol, respectively; and determining, based on a result of the matching, the second text segment in the second text that matches with the first text segment.

5. The method according to claim 4, wherein the determining, based on the result of the matching, the second text segment in the second text that matches with the first text segment comprises:

determining a starting position of the second text segment as the first symbol and an ending position of the second text segment as the second symbol, when the result of the matching indicates that the first symbol is same as the third symbol and the second symbol is same as the fourth symbol;

determining the starting position of the second text segment as the first symbol and the ending position as an end of the second text segment, when the result of the matching indicates that the first symbol is same as the third symbol and the second symbol is different from the fourth symbol;

determining that the starting position of the second text segment as a beginning of the second text segment and the ending position as the second symbol, when the result of the matching indicates that the first symbol is different from the third symbol and the second symbol is same as the fourth symbol; and determining the starting position of the second text segment as the beginning of the second text segment and the ending position as the end of the second text segment, when the result of the matching indicates that the first symbol is different from the third symbol and the second symbol is different from the fourth symbol.

6. The method according to claim 3, further comprising:

merging the first text segment with a next first text segment to obtain a merged text segment, when no second temporary text segment same as the first temporary text segment is found in the third text;

determining an ending position of a previous first text segment to the first text segment in the second text as a starting position of the merged text segment in the second text; and determining an ending position of a next first text segment in the second text as an ending position of the merged text segment in the second text.

7. The method according to claim 1, wherein the determining the plurality of first text segments for audio conversion and the second text for reading display comprises:

obtaining the initial text, and determining, based on the initial text, a first text for audio conversion and the second text for the reading display; and splitting the first text into the plurality of first text segments.

8. The method according to claim 7, wherein the determining, based on the initial text, the first text for audio conversion and the second text for reading display comprises:

performing first text normalization processing on the initial text to obtain the first text; and performing second text normalization processing on the initial text to obtain the second text.

9. The method according to claim 8, wherein:

the first text normalization processing comprises one or more of: deleting target content satisfying a first predetermined condition from the initial text; and performing punctuating on a sentence exceeding a length threshold; and the second text normalization processing comprises deleting target content satisfying a second predetermined condition from the initial text.

10. The method according to claim 7, wherein the splitting the first text into the plurality of first text segments comprises:

determining one or more symbols in the first text, and splitting the first text based on the one or more symbols, to obtain the plurality of first text segments.

11. The method according to claim 1, further comprising:

synthesizing the audio segments into a complete audio, and determining an audio starting time of each of the audio segments in the complete audio; and determining, based on the second text segment synchronized with each of the audio segments, a synchronization relationship between the audio starting time and a text starting position of the second text segment in the second text.

12. The method according to claim 11, further comprising:

obtaining an association relationship by associating the complete audio, the second text, and the synchronization relationship.

13. A synchronization method for audio and text, performed by a client installed on a terminal, comprising:

obtaining a plurality of audio segments and a second text segment synchronized with each of the plurality of audio segments from a server, wherein the plurality of audio segments and the second text segment synchronized with each of the plurality of audio segments are determined by the server performing operations of: determining a plurality of first text segments for audio conversion and a second text for reading display, the plurality of first text segments and the second text being from an initial text; converting the plurality of first text segments into the audio segments playable by an audio device of the terminal, to obtain a first mapping relationship between the plurality of first text segments and the audio segments; performing matching on the plurality of first text segments and the second text, to obtain a second mapping relationship between the plurality of first text segments and second text segments in the second text; and determining the second text segment synchronized with each of the audio segments based on the first mapping relationship and the second mapping relationship;

playing one or more of the plurality of audio segments via the audio device of the terminal in response to a playing operation on a user interface of the client; and displaying, during the playing, a second text segment synchronized with an audio segment of the plurality of audio segments that is being played on the user interface of the client.

14. An electronic device, applied to a server, comprising:

a processor; and a memory, wherein the processor is configured to cause, by calling a program or an instruction stored on the memory, the electronic device to:

determine a plurality of first text segments for audio conversion and a second text for reading display, the plurality of first text segments and the second text being from an initial text;

convert the plurality of first text segments into audio segments playable by an audio device of a terminal, to obtain a first mapping relationship between the plurality of first text segments and the audio segments;

perform matching on the plurality of first text segments and the second text, to obtain a second mapping relationship between the plurality of first text segments and second text segments in the second text; and determine a second text segment synchronized with each of the audio segments based on the first mapping relationship and the second mapping relationship;

send each of the audio segments and the second text segment synchronized with each of the audio segments to a client installed on the terminal, to enable the client to play each of the audio segments via the audio device while displaying the second text segment synchronized with the played audio segment on a user interface of the client.

15. The electronic device according to claim 14, wherein the processor is further configured to cause, by calling a program or an instruction stored on the memory, the electronic device to:

perform matching on each of the plurality of first text segments and the second text based on one or more symbols in each of the plurality of first text segments and one or more symbols in the second text.

16. The electronic device according to claim 14, wherein the processor is further configured to cause, by calling a program or an instruction stored on the memory, the electronic device to:

delete the one or more symbols in the second text to obtain a third text; and for each of the plurality of first text segments:

delete the one or more symbols in the first text segment to obtain a first temporary text segment;

search the third text for a second temporary text segment same as the first temporary text segment;

search the second text for a first symbol previous to the second temporary text segment and a second symbol following the second temporary text segment; and determine, based on the first symbol and the second symbol, the second text segment in the second text that matches with the first text segment.

17. The electronic device according to claim 16, wherein the processor is further configured to cause, by calling a program or an instruction stored on the memory, the electronic device to:

determine, based on the first text segment, a third symbol previous to the first temporary text segment and a fourth symbol following the first temporary text segment;

perform matching on the first symbol and third second symbol and on the second symbol and the fourth symbol, respectively; and determine, based on a result of the matching, the second text segment in the second text that matches with the first text segment.

18. The electronic device according to claim 17, wherein the processor is further configured to cause, by calling a program or an instruction stored on the memory, the electronic device to:

determine a starting position of the second text segment as the first symbol and an ending position of the second text segment as the second symbol, when the result of the matching indicates that the first symbol is same as the third symbol and the second symbol is same as the fourth symbol;

determine the starting position of the second text segment as the first symbol and the ending position as an end of the second text segment, when the result of the matching indicates that the first symbol is same as the third symbol and the second symbol is different from the fourth symbol;

determine the starting position of the second text segment as a beginning of the second text segment and the ending position as the second symbol, when the result of the matching indicates that the first symbol is different from the third symbol and the second symbol is same as the fourth symbol; and determine the starting position of the second text segment as the beginning of the second text segment and the ending position as the end of the second text segment, when the result of the matching indicates that the first symbol is different from the third symbol and the second symbol is different from the fourth symbol.

19. The electronic device according to claim 16, wherein the processor is further configured to cause, by calling a program or an instruction stored on the memory, the electronic device to:

merge the first text segment with a next first text segment to obtain a merged text segment, when no second temporary text segment same as the first temporary text segment is found in the third text;

determine an ending position of a previous first text segment to the first text segment in the second text as a starting position of the merged text segment in the second text; and determine an ending position of a next first text segment in the second text as an ending position of the merged text segment in the second text.

20. An electronic device, comprising:

a processor; and a memory, wherein the processor is configured to perform, by calling a program or an instruction stored on the memory, the method according to claim 13.

* * * * *